(12) United States Patent
D'Amato

(10) Patent No.: US 10,016,080 B2
(45) Date of Patent: Jul. 10, 2018

(54) CONTAINER HAVING A TEARABLE OPENING

(71) Applicant: SEDA International Packaging Group SPA, Naples (IT)

(72) Inventor: Gianfranco D'Amato, Arzano (IT)

(73) Assignee: SEDA INTERNATIONAL PACKAGING GROUP S.p.A., Arzano, Naples (IT)

(*) Notice: Subject to any disclaimer, the term of this patent is extended or adjusted under 35 U.S.C. 154(b) by 0 days.

(21) Appl. No.: 14/766,917

(22) PCT Filed: Feb. 14, 2014

(86) PCT No.: PCT/IB2014/000156
§ 371 (c)(1),
(2) Date: Aug. 10, 2015

(87) PCT Pub. No.: WO2014/125361
PCT Pub. Date: Aug. 21, 2014

(65) Prior Publication Data
US 2015/0366386 A1    Dec. 24, 2015

(30) Foreign Application Priority Data
Feb. 14, 2013   (IT) .......................... RM2013U0034 U

(51) Int. Cl.
*A47G 21/00*    (2006.01)
*B65D 5/54*    (2006.01)
*B65D 75/58*    (2006.01)

(52) U.S. Cl.
CPC .......... *A47G 21/001* (2013.01); *B65D 5/542* (2013.01); *B65D 5/5445* (2013.01); *B65D 75/5827* (2013.01); *B65D 2585/36* (2013.01)

(58) Field of Classification Search
CPC .. B65D 5/542; B65D 5/5445; B65D 75/5827; B65D 5/0209; B65D 5/029; A47G 21/001
(Continued)

(56) References Cited

U.S. PATENT DOCUMENTS 1,502,864 A * 7/1924 Milligan ............ B65D 75/5888
206/525
2,112,143 A    3/1938 Costa
(Continued)

FOREIGN PATENT DOCUMENTS

AU    2010 100 775 A4    8/2010
EP    0023411 A1    2/1981
(Continued)

OTHER PUBLICATIONS

International Search Report for PCT/IB2014/000156 dated May 28, 2014. 2 pages.
(Continued)

*Primary Examiner* — Christopher Demeree
(74) *Attorney, Agent, or Firm* — Fish & Richardson P.C.

(57) ABSTRACT

There is provided a box-like container (1) for the storing and transporting of a food product, comprising a prismatic shaped main body (10) including a first wall (11) for the closing of a first end of the container (1), a second wall (12) for the closing of a second end of the container (1), and a peripheral wall (13), the container is characterized in that it further comprises opening means (20) arranged on the entire surface of said peripheral wall (13).

9 Claims, 6 Drawing Sheets

(58) Field of Classification Search
USPC ........ 229/235, 202, 4.5, 101.1, 126, 201, 93
See application file for complete search history.

(56) References Cited

U.S. PATENT DOCUMENTS

| | | | | |
|---|---|---|---|---|
| 2,132,966 | A | * | 10/1938 | O'Brien ................ A23G 9/503 229/202 |
| 2,800,267 | A | | 7/1957 | O Neil |
| 5,484,100 | A | * | 1/1996 | Rigby ..................... B65D 5/54 229/101.1 |
| 2011/0186569 | A1 | | 8/2011 | Maier |

FOREIGN PATENT DOCUMENTS

| | | | |
|---|---|---|---|
| WO | 2007067705 | A2 | 6/2007 |
| WO | 2009023286 | A1 | 2/2009 |

OTHER PUBLICATIONS

Office Action which dated Oct. 6, 2017 in corresponding European Application No. EP14715986.7.
Third Party Observation filed on Jul. 20, 2017 in corresponding European Application No. EP14715986.7.

* cited by examiner

CONTAINER HAVING A TEARABLE OPENING

CROSS-REFERENCE TO RELATED APPLICATIONS

This is a U.S. National Phase Application under U.S.C. 371 of International Patent Application No. PCT/IB2014/000156, filed on Feb. 14, 2014 which claims the benefit of Italian Application No. RM2013U000034, filed on Feb. 14, 2013. The International Application was published on Aug. 21, 2014 as International Publication No. WO/2014/125361 under PCT Article 21(3). The contents of the above applications are incorporated herein in their entirety.

The present invention relates to a box type container, and more specifically to a box type container for the transporting and the subsequent consumption of a food product.

STATE OF THE ART

Up to now, several kinds of box-type containers and which are suitable for the transporting of a food product therein contained from a selling point and the subsequent consumption are already known.

For example, in the large distribution of food to consumers such as the "fast foods" or the like, typically the food product is sold in biodegradable material box containers such as cardboard or the like, such types of containers being known with the name of "Clamshells". This type of "clamshell" container must have certain features of stackability, resistance to temperature, resistance to food substances coming from the food product arranged inside thereof, etc.

Typically, a "clamshell" container must contain the food product in the shape of hot sandwich, must be rigid enough to be stacked with other similar types of box-like containers, and must have the possibility of being opened in two halves in order to have the food product consumed therein.

However, these types of containers have the drawback of not being suitable to be used as support to grab the sandwich or hot product therein and during its consumption. Thus, to the user it has always presented the need to use paper towel to be able to consume the food by pulling the latter out from the container.

On the other hand, it is known from Spanish Utility Model ES1053298U in the name of Saenz de Santamaria a cylindrical shaped box-type container for the transporting and the subsequent consumption of circular shaped sandwiches, such as hamburgers or the like. According to this box-type container after the insertion of the sandwich and the closing of the container, it is provided the possibility of be separated into two symmetrical halves through a pre-cut tear line, the separation of the two box halves creates two semicylindrical half containers, that provides the support for the user during the consumption of the sandwich.

However, this type of container has the drawback given by the fact that, during the consumption of the sandwich and in order to access the final part of the sandwich, it is necessary to manually extract the sandwich from the box. This entails a compromise between the hygiene and convenience for the user. Alternatively, it is provided to open the box and extract the sandwich from the top thereof and by putting its content onto a properly prepared surface.

Furthermore, in case of rolls (the so-called "ROLL" such as, for example, Arabic or Greek sandwiches) it is provided that the same are served within an envelope or, alternatively, a cylindrical shaped box-type container.

In both cases, for the consumption of the cylindrical shaped sandwich or "ROLL", it is expected to open the container and the grasping of the same with the hands. Alternatively, by holding the pouch with one hand and by pulling the sandwich with the other hand as it is consumed.

In both cases, there is still the drawback given by the fact that during the consumption of the sandwich and to have the final part thereof, it is necessary to manually extract the latter from the container. This entails a compromise between the hygiene and convenience for the user. Alternatively, the user can open the pouch and overturn the final part of the sandwich onto a suitably prepared surface to consume the latter with his own hands.

Therefore, the aim of the present invention is to solve the above-mentioned drawbacks by providing a container that foresees the possibility of being opened progressively during the consumption of the food product therein contained, and without the user having to touch the food product with its fingers.

BRIEF DESCRIPTION OF THE INVENTION

The present invention provides an improved container for the consumption of a food product such as a sandwich or similar therein contained, the container has an easy opening which allows the consumption of the food product in a progressive manner through a progressive opening of the container, and at the same time that constituting a support for grasping the food product during its consumption without coming into contact with the user's fingers.

Thus, the present invention provides an improved container for a food product substantially according to the appended claims. Furthermore, the present invention also provides a blank for the making of said container.

DETAILED DESCRIPTION OF THE INVENTION

A detailed description of a preferred embodiment of the container of the present invention will now be given, by way of non limiting example, with reference to the accompanying drawings, wherein.

With reference now to FIGS. 1 to 4, there is illustrated the container of the present invention. According to the invention there is provided a container 1 for the storing and the transporting of a cylindrical shaped food product (such as, for example, an Arabic or Greek Roll). As can be seen in the figures, the box-like container 1 comprises a prismatic shaped main body that includes a first wall 11 closing a first end of the container 1, a second wall 12 closing the opposite end of the container 1, and a peripheral wall 13.

The container 1 has opening means which consists of a pre-cut line 20 arranged onto the entire surface of said peripheral wall 13. More precisely, the pre-cut line 20 is arranged peripherally onto the surface of said peripheral wall 13 with an angle in a spiral arrangement or pattern.

Figure 1:
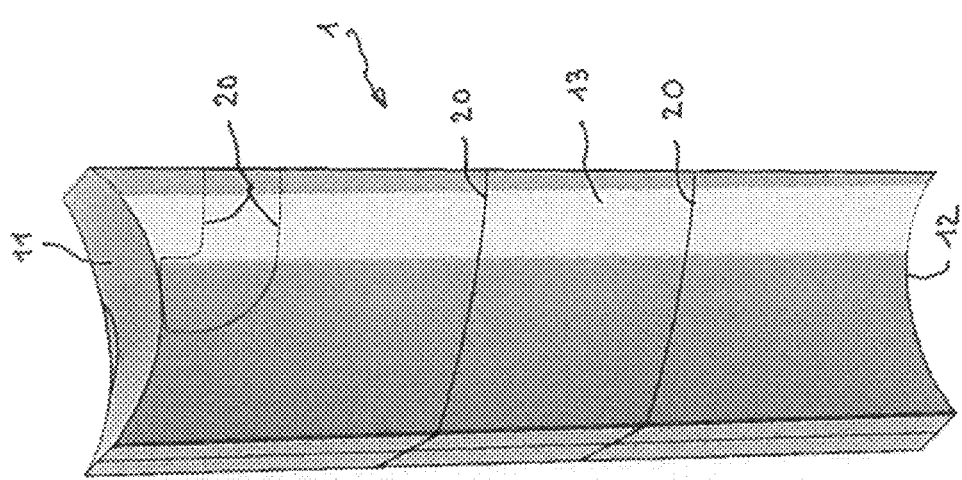
FIG. 1 is a perspective view from above and to one side of the container of the present invention in the closed condition.
Figure 2:
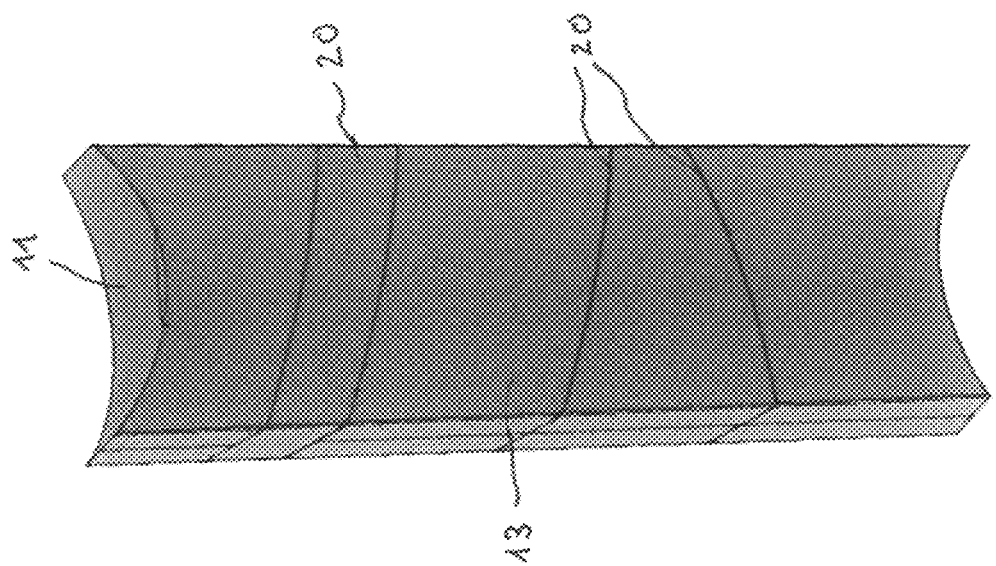
FIG. 2 is a perspective view from above and from another side of the container of FIG. 1.
Figure 3:
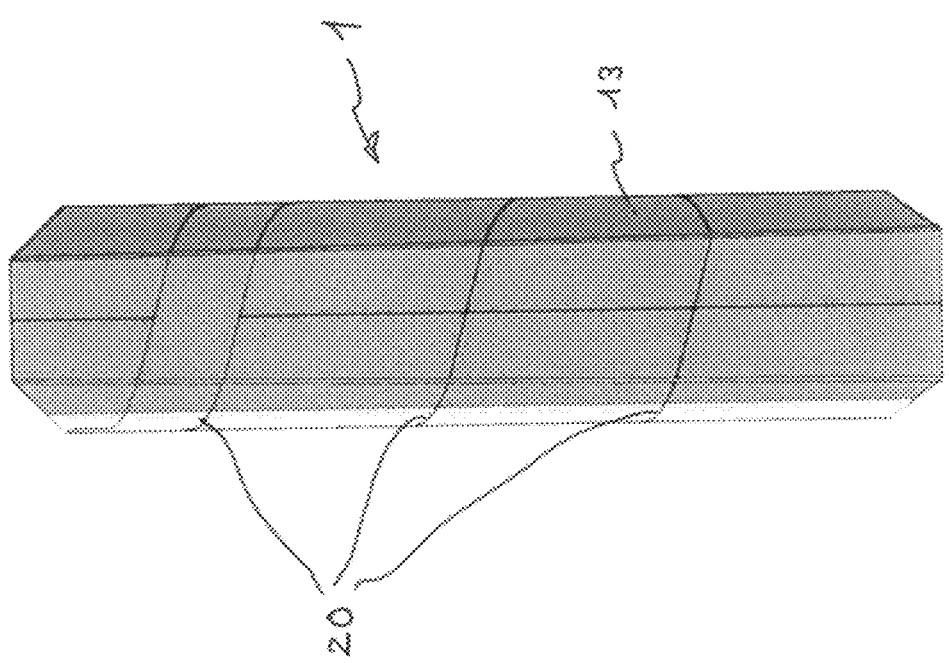
FIG. 3 is an elevational view from one side of the container of FIG. 1.
Figure 4:
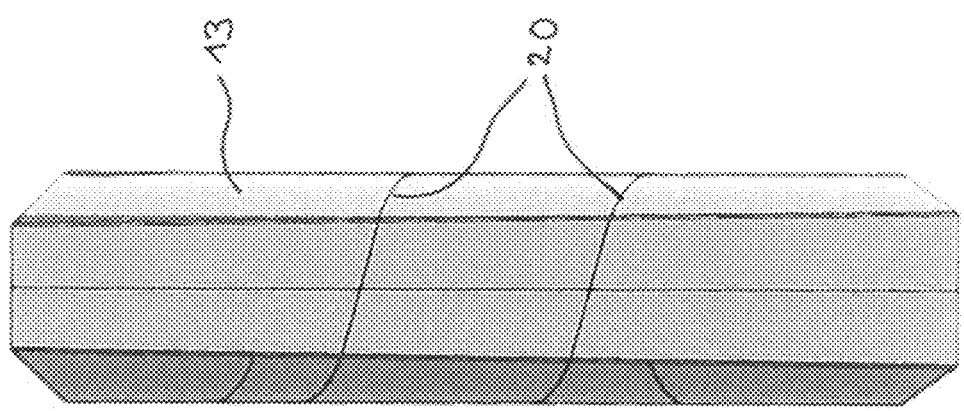
FIG. 4 is an elevational view from another side of the container of FIG. 1.
Figure 6:
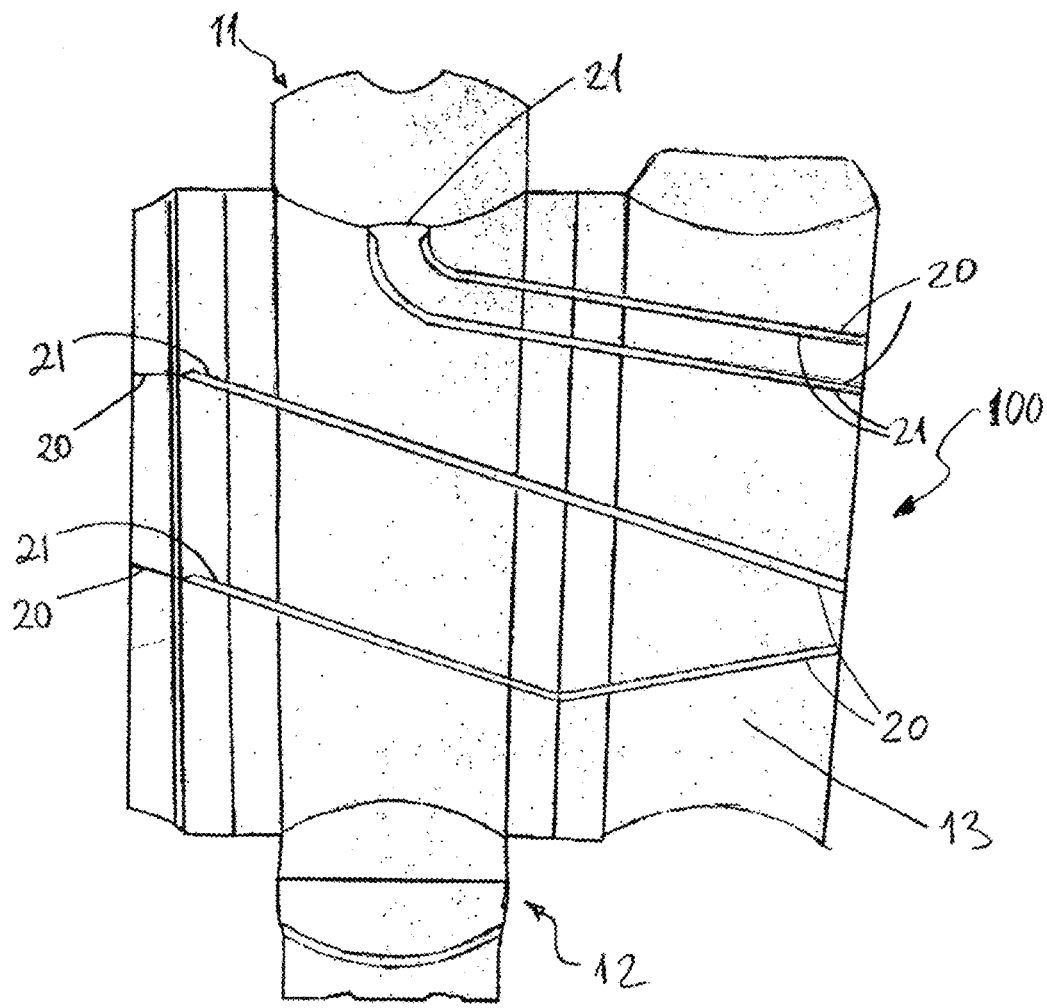
FIG. 6 is a top plan view of a flat blank for the making of the container of the present invention.

Further and particularly with reference to FIGS. 2 and 6, the pre-cut line 20 at an end portion of the container 1 it is arranged at a different angle with respect to the original angle. Accordingly, during the tearing of the container following the pre-cut line this arrangement allows to create a part of the container that serves as a support for the final portion of the food product during the consumption of the same, and when the rest of the container (1) has been torn.

Figure 5:
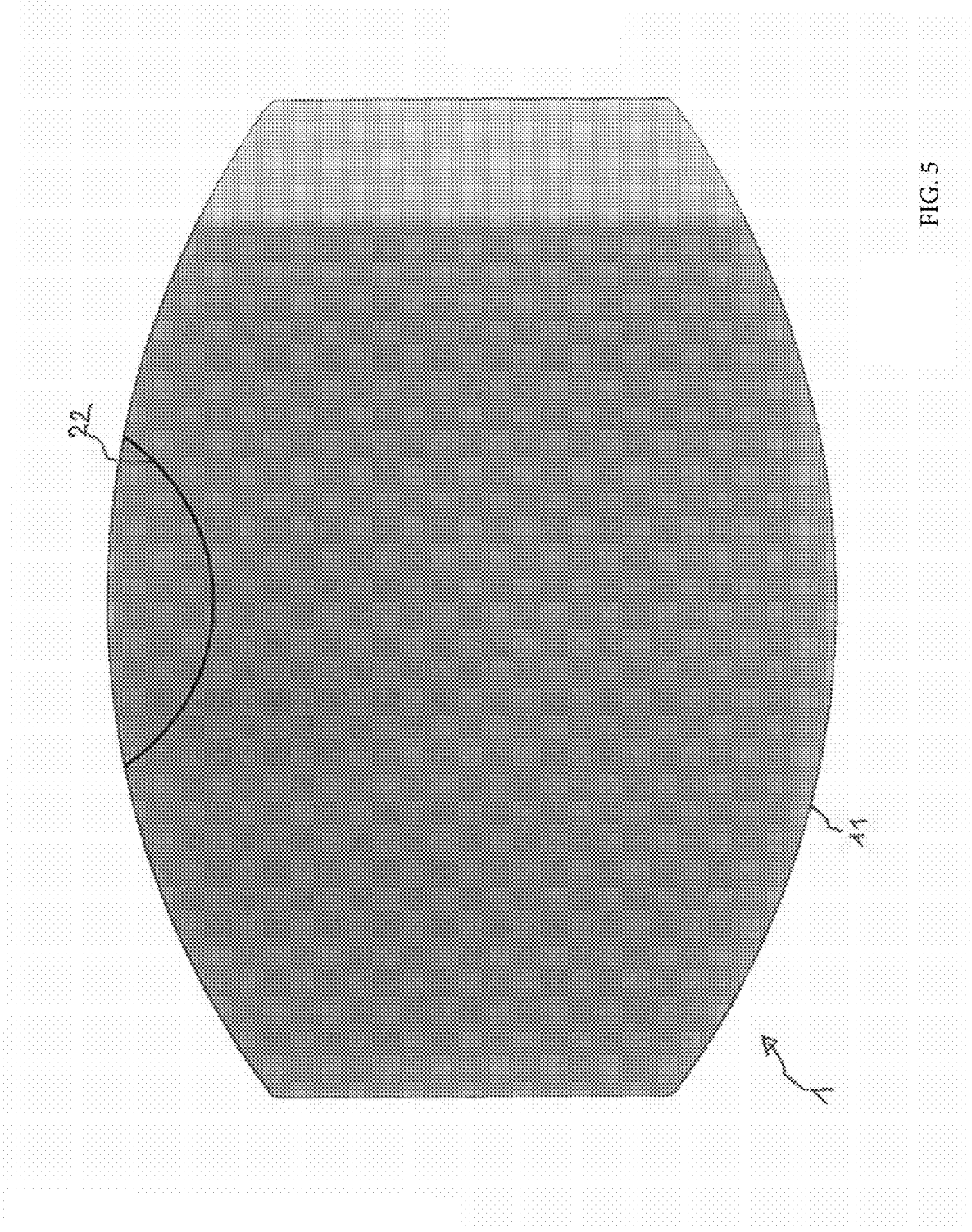
FIG. 5 is a top plan view of the container of FIG. 1.

With particular reference now to FIG. 5, it is illustrated therein a closing wall 11 of the container 1. As can be seen in this figure, the pre-cut line 20 extends up to a pre-cut line 22 which originates at an edge part of said wall 11 at the end of the container 1.

With reference now to FIG. 6, there is shown a blank 100 for the making of a box-shaped container 1 according to the present invention and as illustrated above.

It is important to be noted here that the box-like container 1 comprises a pair of pre-cutting lines 20 and 21 both arranged parallel side by side onto the peripheral wall 13. The pre-cut line 21 is a "half cut" line for the delamination of the wall thickness of the container 1 during the tearing thereof.

The invention claimed is:

1. A box-like container for the storing and transporting of a food product, comprising an essentially prismatic shaped main body including a first wall for the closing of a first end of the container, a second wall for the closing of a second end of the container, and a peripheral wall having a surface,
    an opening means consisting of a pre-cut line arranged on the surface of said peripheral wall and extending from one edge of the peripheral wall to another edge at a first angle in a spiral pattern and wherein at an end portion of the container said pre-cut line is arranged at an angle which is different from the first angle of the pre-cut line.

2. A box-like container for the storing and transporting of a food product according to claim 1, wherein said at least one pre-cut line originates at an edge part of said first wall for closing a first end of the container and matches a pre-cut line which is connected with said at least one pre-cut line.

3. A box-like container for the storing and transporting of a food product according to claim 2, wherein said opening means comprises at least one pre-cut line peripherally arranged onto the surface of said peripheral wall.

4. A box-like container for the storing and transporting of a food product according to claim 1, comprising a pair of pre-cut lines and wherein one of said pair of pre-cut lines is a "half cut" line in a thickness direction for delaminating a wall thickness of the container during the tearing thereof along said pre-cut lines.

5. A blank for making a box-shaped container according to claim 1, wherein said blank comprises a first wall, a second wall, a peripheral wall, and an opening means comprising at least one pre-cut line that obliquely extends along the entire peripheral wall with a first angle.

6. The blank according to claim 5, wherein at an end portion of the blank said pre-cut line is arranged at an angle which is different from the first angle of the pre-cut line.

7. The blank according to claim 5 wherein said at least one pre-cut line originates at an edge part of said first wall and matches a pre-cut line which is connected with said at least one pre-cut line.

8. The blank according to claim 5, wherein the blank comprises a pair of pre-cut lines and wherein one of said pair of pre-cut lines is a "half cut" line in a-thickness direction for delaminating a wall thickness during the tearing thereof along said pre-cut lines.

9. A box-like container for the storing and transporting of a food product, comprising an essentially prismatic shaped main body including a first wall for the closing of a first end of the container, a second wall for the closing of a second end of the container, and a peripheral wall having a surface, the opening means consists of a pre-cut line arranged onto the entire surface of said peripheral wall and extending from one edge of the peripheral wall to another edge at a first angle in a spiral pattern, wherein said at least one pre-cut line originates at an edge part of said first wall and matches a pre-cut line which is connected with said at least one pre-cut line and wherein at an end portion of the blank, the pre-cut line is arrayed at a different angle than first angle of the pre-cut line.

* * * * *